(12) United States Patent
Winzer et al.

(10) Patent No.: US 10,516,480 B2
(45) Date of Patent: Dec. 24, 2019

(54) OPTICAL NETWORK SPAN SENSING

(71) Applicant: Alcatel-Lucent USA Inc., Murray Hill, NJ (US)

(72) Inventors: Peter J. Winzer, Aberdeen, NJ (US); John Edward Simsarian, Highland Park, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 16/026,243

(22) Filed: Jul. 3, 2018

(65) Prior Publication Data

US 2018/0331760 A1  Nov. 15, 2018

Related U.S. Application Data

(63) Continuation of application No. 14/982,111, filed on Dec. 29, 2015, now Pat. No. 10,038,504.

(51) Int. Cl.
*H04B 10/80* (2013.01)
*H04B 10/077* (2013.01)
(Continued)

(52) U.S. Cl.
CPC ....... *H04B 10/2572* (2013.01); *H04B 10/077* (2013.01); *H04B 10/0773* (2013.01); *H04B 10/07951* (2013.01); *H04B 10/802* (2013.01)

(58) Field of Classification Search
CPC .............. H04B 10/2572; H04B 10/077; H04B 10/0773; H04B 10/07951; H04B 10/802; H04B 10/40; H04B 10/50; H04B 10/60
See application file for complete search history.

(56) References Cited

U.S. PATENT DOCUMENTS

2010/0098420 A1  4/2010  Ibragimov et al.
2011/0229028 A1  9/2011  Sakamoto et al.
(Continued)

FOREIGN PATENT DOCUMENTS

CN   204156870 U   9/2011
EP      2913941 A2   9/2015

OTHER PUBLICATIONS

Geyer, J. C., et al. "Channel parameter estimation for polarization diverse coherent receivers." IEEE Photonics Technology Letters 20.10 (2008): 776-778.

(Continued)

*Primary Examiner* — Darren E Wolf
(74) *Attorney, Agent, or Firm* — Nokia Technologies Oy

(57) ABSTRACT

An apparatus includes a polarization beam splitter (PBS) and an optical detector. The PBS is configured to receive a polarized optical signal transported via an optical communication path of an optical network. The detector is configured to receive from the PBS a first polarization component of the optical signal, and to produce a first electrical measure of the first polarization component. A processor is configured to determine a dynamic metric of the optical communication path based at least on the first electrical measure. Some embodiments also include a second detector configured to receive from the PBS a second polarization component of the optical signal. The second detector produces a second electrical measure of the second polarization component, and the processor is configured to determine the dynamic metric based on both the first and second electrical measures.

15 Claims, 7 Drawing Sheets

(51) Int. Cl.
*H04B 10/079* (2013.01)
*H04B 10/2507* (2013.01)

(56) References Cited

U.S. PATENT DOCUMENTS

| | | |
|---|---|---|
| 2011/0229128 A1 | 9/2011 | Sakamoto et al. |
| 2014/0023360 A1 | 1/2014 | Iizuka |
| 2015/0180856 A1 | 10/2015 | Nakashima |
| 2015/0280856 A1 | 10/2015 | Nakashima |

OTHER PUBLICATIONS

Hui, R., et al. "Fiber optic measurement techniques". Dec. 12, 2008, pp. 161-162, 1st Edition, Elsevier Academic Press, United States of America, ISBN: 978-0-12-373865-3.

Che, Di, et al. "160-Gb/s stokes vector direct detection for short reach optical communication." Optical Fiber Communication Conference 2014. Optical Society of America, XP032632824, DOI: 10.1109/OFC.2014.6887234.

International Search Report and Written Opinion; dated Mar. 22, 2017 for PCT Application No. PCT/US2016/069068.

OPTICAL NETWORK SPAN SENSING

CROSS-REFERENCE TO RELATED APPLICATIONS

This application is a continuation of U.S. patent application Ser. No. 14/982,111, filed 29 Dec. 2015, and entitled "OPTICAL NETWORK SPAN SENSING," which is incorporated herein by reference in its entirety.

TECHNICAL FIELD

The present invention relates generally to the field of optical communications, and, more particularly, but not exclusively, to methods and apparatus useful for sensing optical path disturbances in optical communications fiber spans.

BACKGROUND

This section introduces aspects that may be helpful to facilitate a better understanding of the inventions. Accordingly, the statements of this section are to be read in this light and are not to be understood as admissions about what is in the prior art or what is not in the prior art. Any techniques or schemes described herein as existing or possible are presented as background for the present invention, but no admission is made thereby that these techniques and schemes were heretofore commercialized, or known to others besides the inventors.

Optical communications systems sometimes include components to monitor the status of optical paths within a network of paths to detect, e.g. a path interruption that may impact systems operation. Sometimes such monitoring is performed by use of an optical supervisory channel (OSC) detected at a receiver node of the system, and may additionally transmit system-related data via modulation of the OSC.

SUMMARY

The inventors disclose various apparatus and methods that may be beneficially applied to, e.g., optical networks and software-defined networks (SDNs). While such embodiments may be expected to provide improvements in performance and/or reduction of cost of such apparatus and methods, no particular result is a requirement of the present invention unless explicitly recited in a particular claim.

One embodiment provides an apparatus, e.g. an optical network monitor, including a polarization beam splitter (PBS) and an optical detector. The PBS is configured to receive a polarized optical signal transported via an optical communication path of an optical network. The detector is configured to receive from the PBS a first polarization component of the optical signal, and to produce a first electrical measure of the first polarization component. A processor is configured to determine a dynamic metric (DM) of the optical communication path based at least on the first electrical measure. Some embodiments also include a second detector configured to receive from the PBS light of a second polarization component of the optical signal. The second detector produces a second electrical measure of the second polarization component, and the processor is configured to determine the DM based on both the first and second electrical measures. In some cases the second polarization component is polarization-aligned with the first polarization component. Determination of the DM may be based on an incomplete characterization of the polarization state of said optical signal and/or may discard a portion of the optical power of the optical signal in some embodiments. In some embodiments the processor is configured to determine at least one Stokes parameter from the first and second electrical measures.

In some embodiments the PBS is further configured to receive the polarized optical signal, optionally bearing modulated data. The polarized optical signal may optionally bear an optical supervisory channel.

In some embodiments the first and second detectors are a first pair of detectors, and the apparatus further includes a second pair of detectors configured to receive first and second optical signals produced by interfering together polarization components of the polarized optical signal. The interfering may be performed by, e.g. an interferometer.

In some embodiments the first and second detectors are configured to receive respective portions of the optical signal produced by interfering light, e.g. properly polarization-aligned light, from first and second PBS outputs, and the apparatus includes a third detector configured to produce a third electrical representation of light from the first PBS output. The processor may be further configured to determine the DM from the first, second and third electrical representations. Some embodiments further include a fourth detector configured to produce a fourth electrical representation of light from the second PBS output, in which case the processor may be further configured to determine the DM from the first, second, third and fourth electrical representations.

In some embodiments the PBS is a first PBS configured to receive a first portion of the optical signal, and a second PBS is configured to receive a second portion of the optical signal, in which case the processor may be further configured to determine the DM based on the first and second portions. In some such embodiments light received by the second PBS is phase-shifted by a predetermined amount relative to light received by the first PBS, thereby altering its polarization state.

In some embodiments the DM characterizes a polarization rotation of the polarized optical signal. In some embodiments the DM characterizes the optical network on a per-span basis. In some embodiments the processor is configured to output a control signal to an SDN controller, the control signal being adapted to communicate the DM or a parameter derived from the DM, to the SDN controller.

Another embodiment is an apparatus, e.g. an optical network monitor, that includes an SDN controller. The controller is configured to change a routing configuration of an optical communication network in response to a signal derived from the first and second separated polarization components of a received optical signal. In some embodiments the derived signal is based on Stokes parameters of the received optical signal. In some embodiments the derived signal is based on first and second signal portions of the received optical signal, wherein the first signal portion is phase-shifted with respect to the second signal portion. In some embodiments the derived signal is based on first and second polarization components of the received optical signal, wherein the first polarization component is interfered with the second polarization component.

Other embodiments include methods, e.g. of manufacturing an apparatus, configured as described for any of the preceding embodiments.

BRIEF DESCRIPTION OF THE DRAWINGS

A more complete understanding of the present invention may be obtained by reference to the following detailed description when taken in conjunction with the accompanying drawings wherein:

in FIGS. 5-8, wherein $R_{FOM}=1$ corresponds to agreement between the commercial polarization analyzer and the particular OSC monitor embodiment, and wherein $R_{FOM} \leq 1$ corresponds to disagreement between the commercial polarization analyzer and the particular OSC monitor embodiment.

DETAILED DESCRIPTION

Figure 1:
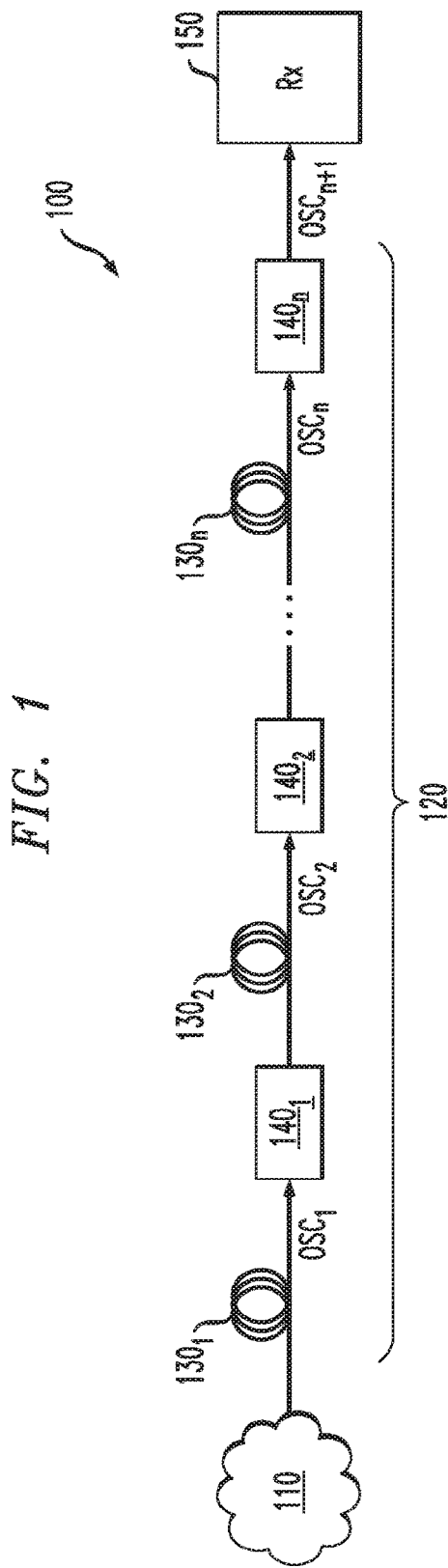
FIG. 1 illustrates an optical network configured according to various embodiments, e.g. to produce a dynamic metric (DM) representative of the optical integrity of each of several optical spans of the network.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Among the conventional uses of an OSC is detection of optical discontinuity (e.g. broken fiber) by monitoring the intensity of the OSC. Those skilled in the optical communication arts understand that conventionally the OSC is a single-polarization signal at a specific wavelength that is typically out-of-band with respect to communication data channels propagated on the same optical signal. The OSC is typically intensity-modulated at a slow bit rate compared to the communication data channels, e.g. wavelength-division multiplexed signal channels. As such, the OSC bears status information of the respective link for network health monitoring. Typically such monitoring is performed using a single optical receiver that is only sensitive to the total power of the OSC, in agreement with its single-polarization, intensity modulated characteristics. Such conventional techniques provide little or no indication of less severe impairments that could otherwise be used by an operator or a network controller, e.g. a software-defined network (SDN) controller, to proactively reconfigure the network or otherwise take action to minimize the chance of service interruption.

Embodiments described herein address some shortcomings of conventional techniques by, e.g. monitoring the polarization state of the light at the end of one or more spans of an optical transport line to more precisely detect conditions that may interrupt service provided via the span(s).

FIG. 1 illustrates an embodiment of an optical network 100 consistent with principles described below. A transmission network 110 provides a signal $OSC_1$ to a transmission line 120, which includes several fiber spans $130_1$, $130_2$ ... $130n$. Each of junctions, or nodes, $140_1$, $140_2$ ... $140_n$ follows a corresponding fiber span 130. The junction $140_1$ receives the $OSC_1$ signal and produces an $OSC_2$ signal. The junction $140_2$ receives the $OSC_2$ signal and produces an $OSC_3$ signal, and so on, with the junction $140_n$ producing an $OSC_{n+1}$ signal. The junctions 140 may include any conventional functions, e.g. amplification or dispersion compensation. In addition to any such conventional functions, one or more junctions 140 also includes an OSC monitor consistent with embodiments described below, e.g. configured to characterize the polarization state of the OSC received by that junction 140. A receiver 150 receives the $OSC_{n+1}$ signal. The receiver 150, which may be otherwise conventional, may also include an OSC monitor as described below.

Figure 2:
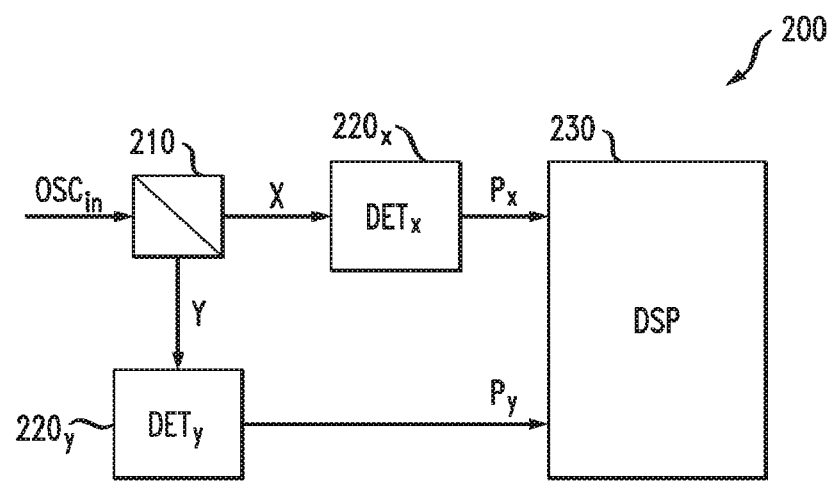
FIG. 2 illustrates an embodiment illustrating general principles of the disclosure, e.g. a polarization beam splitter (PBS) configured to separate orthogonal polarizations of an optical signal and a processor configured to determine the DM referred above.

FIG. 2 illustrates an embodiment of an OSC monitor 200 which may be present in one or more of the junctions 140 and/or the receiver 150. This figure presents certain aspects of various embodiments in concise form for clarity of the following discussion. A polarization beam splitter (PBS) 210 receives the OSC signal, designated $OSC_{in}$. A first polarization component, e.g. x-polarized light, is directed to a detector $220_x$, while a second polarization component, e.g. y-polarized light, is directed to a detector $220_y$. The decomposition of the OSC signal is not known to be performed in any conventional OSC receiver. Note that while the absolute polarization of the decomposed optical signals from the PBS 210 may be arbitrary, the signals are generally expected and are treated without limitation to be about orthogonal to each other. Therefore while the signal electrical representations are referred to as including x and y subscripts, these subscripts do not necessarily imply any particular orientation of the decomposed optical signals with respect to any coordinate axis.

The detectors $220_x$, $220_y$, convert their respective optical input signals to the electrical domain, which signals represent the power of the respective optical signal and may be referred to generally without limitation as $P_x$ and $P_y$, and direct the converted signals to a processor 230, e.g. a digital signal processor. Various embodiments also include analog-to-digital converters (not shown) to condition the electrical signals before input to the processor 230, e.g. by digitizing the signals. The processor 230 may be dedicated to OSC monitoring functions, or may provide other functions related to, e.g. equalization, demodulation and/or decoding. The state-of-the-art single-polarization intensity modulated OSC signal is readily reconstructed via the operation $P_x+P_y$. In particular the processor 230 may also be configured to perform various OSC monitoring functions based on the decomposed polarization components of the OSC signal. For example, the processor 230 may compute a dynamic metric (DM) based on the $P_x$ and $P_y$ signals. As used herein and in the claims, a dynamic metric, or DM, is a time-dependent value based on one or more Stokes parameters that characterize the OSC signal. Those skilled in the optical arts will appreciate that the Stokes parameters may define the polarization state of an optical signal such as $OSC_{in}$. The subject of the DM is described in detail below.

The inventors have recognized that various DMs may provide feedback on the condition of the optical span that may be effective in inferring the operational condition of the span 130 preceding the monitor 200. Moreover, in various embodiments such monitoring may be implemented with relatively few components, thus reducing size and cost. Such embodiments may be installed at junctions between fiber spans, e.g. amplification points, thereby providing information on a per-span basis. It is noted that while various embodiments are described with respect to monitoring the OSC signal, any optical signal propagating on the transmission line 120, such as a data-carrying signal, may be used in other embodiments with similar utility.

The processor 230 may compute a sum value $\mathcal{P}(t)=P_x+P_y$ from the digital forms of these signals. $\mathcal{P}(t)$ represents the intensity of the OSC signal, and the processor may implement any conventional computation or function with respect to this value, such as conventional OSC monitoring, e.g. extracting the OSC data communication information from the OSC. In addition to such conventional functions, the processor 230 determines a difference value $\mathcal{D}(t)=P_x-P_y$ as a characteristic of the optical network 100. In general this value is expected to be time-dependent, as reflected in the notation. In various embodiments the processor 230 is configured to direct control parameters determined at least in part based on $\mathcal{D}(t)$ to a SDN control plane. The control plane may include, e.g. an SDN controller or a human operator that may make decisions regarding possible routing of traffic within the network, e.g. away from an impacted span. In some embodiments the control plane may present a warning to the network operator that the fiber is being disturbed, but take no further action. The network operator could then make an appropriate operational decision, e.g. reconfiguring the network, sending a warning message to a construction crew, or the like. In other embodiments an SDN controller may be configured to automatically take such action.

Figure 3:
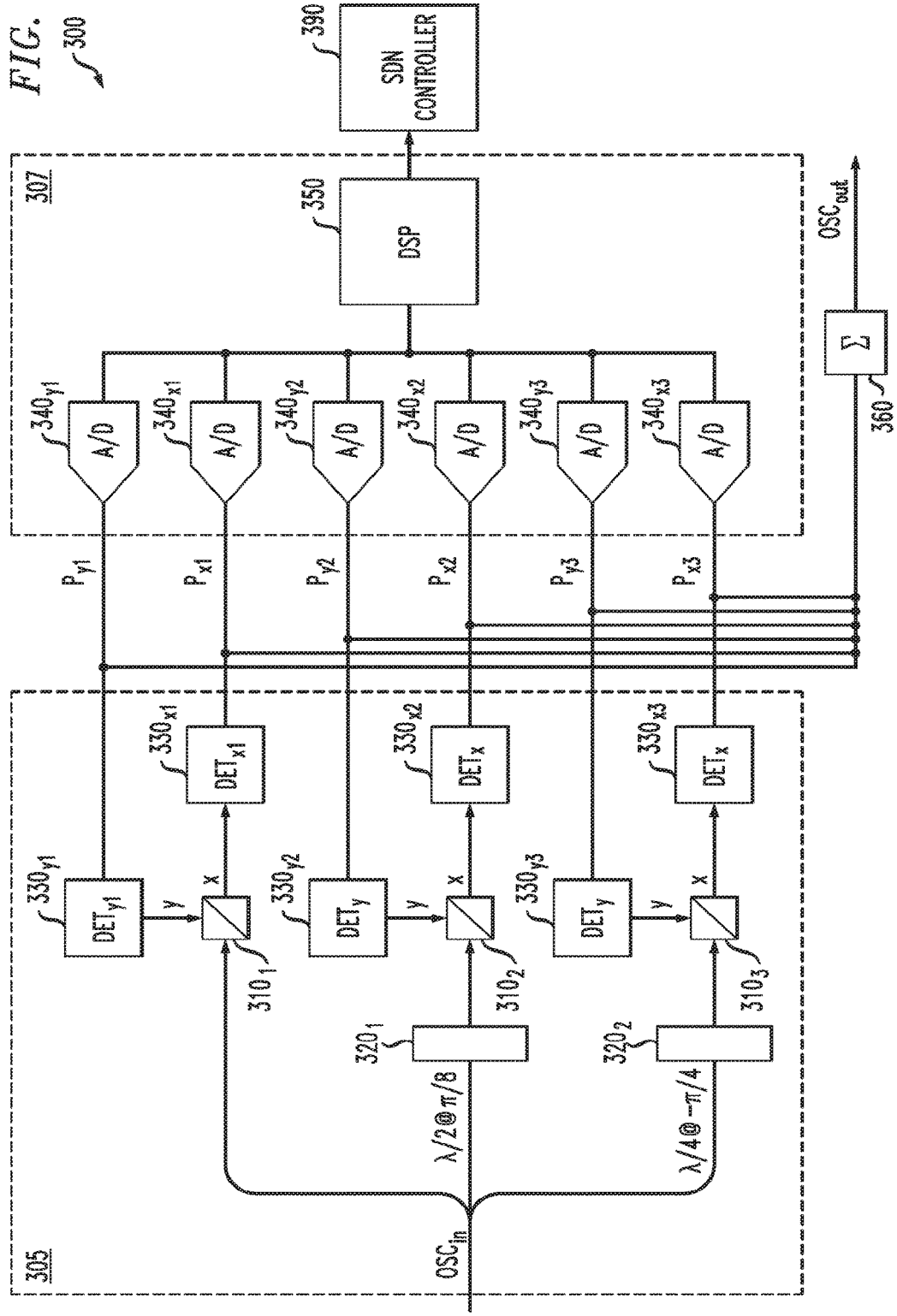
FIG. 3 illustrates an embodiment of an apparatus, e.g. an OSC monitor, configured to determine a DM from a received OSC signal, including by making a complete and lossless determination of the Stokes parameters that describes the polarization state of the OSC signal without loss of optical power.

FIG. 3 illustrates another embodiment, an apparatus, e.g. an OSC monitor 300 including an optical front-end 305 and an electrical back-end 307. The apparatus 300 is configured to determine a DM such as that previously described.

Referring first to the front-end 305, an unreferenced power divider about equally splits an $OSC_{in}$ signal among three separate paths. A first polarization beam splitter (PBS) $310_1$ receives one $OSC_{in}$ signal portion and decomposes the optical signal into two nominally orthogonal signal components, e.g. an x-component and a y-component. These signal components are converted to the electrical domain by detectors $330_{x1}$, $330_{y1}$, e.g. photodiodes, to electrical representations $P_{x1}$ and $P_{y1}$. Similarly, a second PBS $310_2$ receives a portion of the $OSC_{in}$ signal via a waveplate $320_1$, and a PBS $310_3$ receives a portion of the $OSC_{in}$ signal via a waveplate $320_2$. The waveplate $320_1$ applies a predetermined phase shift, or delay, e.g. about $\pi/8$, to one of the polarization components of its corresponding signal portion, e.g. the x-component. The waveplate $320_2$ applies a predetermined phase shift, e.g. about $-\pi/4$, to the same polarization component of its corresponding signal, e.g. the x-component. Thus light received by the PBS $310_2$ is polarization-state-shifted by a predetermined amount relative to light received by the PBS $310_1$, and light received by the PBS $310_3$ is polarization-state—shifted by a predetermined amount relative to light received by both the PBS $310_1$ and the PBS $310_2$. Those skilled in the optical arts will appreciate that a phase plate may shift the phase of one polarization component of an optical signal differently than the phase plate shifts the phase of a different polarization component of the optical signal. Such differential phase shift typically results in a change of the polarization state of the optical signal. PBSs $310_2$, $310_3$ separate polarizations in each respective signal path, and detectors $330_{x2}$, $330_{y2}$, $330_{x3}$, $330_{y3}$ convert the PBS output to electrical-domain signals.

Analog-to-digital converters (ADCs) $340_{x1}$ ... $340_{x3}$ and $340_{y1}$ ... $340_{y3}$ each convert a respective one of the detector outputs to digital-electrical signals. A processor 350, e.g. a digital signal processor (DSP), performs various computations that may be used to infer characteristics of the transmission line 120 as described further below. The signals are combined at a summing node 360 to produce an $OSC_{out}$ signal. The $OSC_{out}$ signal may be used, e.g. according to any conventional usage of an optical supervisory channel. Such operation may, for instance, maintain backward compatibility with conventional OSC modules. The illustrated configuration also provides the ability to use comparatively slow ADCs 340 that do not preserve the full bandwidth of the $OSC_{in}$ signal. By passing the $OSC_{out}$ signal, this signal may retain substantially all of the bandwidth of the received signal, disregarding parasitic losses.

The $P_{x1}$, $P_{x2}$ and $P_{x3}$ outputs respectively represent the power of the optical signal component received by each of the detectors $330_{x1}$, $330_{x2}$ and $330_{x3}$. Similarly, the $P_{y1}$, $P_{y2}$ and $P_{y3}$ outputs respectively represent the power of the optical signal component received by each of the detectors $330_{y1}$, $330_{y2}$ and $330_{y3}$. Stokes parameters of the $OSC_{in}$ signal may be determined from these power values.

The Stokes parameters may be used to determine a DM related to the state of the $OSC_{in}$ signal. In one embodiment, a change of polarization angle, $\Delta\theta$, over a time increment, $\Delta t$, of the $OSC_{in}$ signal may be determined by the relationship $$\Delta\theta = \frac{1}{\pi}\arcsin\left(\frac{1}{2}\sqrt{\Delta s_1^2 + \Delta s_2^2 + \Delta s_3^2}\right) \quad (1)$$

where $\Delta s_1$, $\Delta s_2$ and $\Delta s_3$, are the incremental changes of the Stokes parameters $s_1$, $s_2$ and $s_3$ over the time increment. The parameter $s_1$ at a particular instant in time may be determined as $(P_{x1}-P_{y1})/(P_{x1}+P_{y1})$, $s_2$ may be determined as $(P_{x2}-P_{y2})/(P_{x2}+P_{y2})$, and $s_3$ may be determined as $(P_{x3}-P_{y3})/(P_{x3}+P_{y3})$. The numerator is each case is the previously-defined quantity $\mathcal{D}$ at the particular instant in time, while the denominator is the previously-defined power $\mathcal{P}$ associated with the portion of the optical signal received by the particular PBS. Thus, for $\Delta t = t_2 - t_1$, the portion of Eq. 1 within the radical may be expressed as $$\left[\frac{\mathcal{D}_1(t_2)}{\mathcal{P}_1(t_2)} - \frac{\mathcal{D}_1(t_1)}{\mathcal{P}_1(t_1)}\right]^2 + \left[\frac{\mathcal{D}_2(t_2)}{\mathcal{P}_2(t_2)} - \frac{\mathcal{D}_2(t_1)}{\mathcal{P}_2(t_1)}\right]^2 + \left[\frac{\mathcal{D}_3(t_2)}{\mathcal{P}_3(t_2)} - \frac{\mathcal{D}_3(t_1)}{\mathcal{P}_3(t_1)}\right]^2. \quad (2)$$

A polarization rotation angular speed may be determined by $$PS = \frac{\Delta\theta}{\Delta t} = \Delta\theta * \text{sampling rate}. \quad (3)$$

The PS value may be used as a DM of the received $OSC_{in}$ signal. For example, the polarization of the $OSC_{in}$ signal is expected to drift over time as a result of slow background changes to the propagation characteristics of the optical span, e.g. due to temperature changes. However, above a predetermined PS threshold, it may be concluded effects other than background effects are responsible for a measured value of PS. For example, mechanical movement or impact-induced transient strain experienced by an optical fiber or fiber bundle due to a direct or nearby indirect disturbance may result in rapid changes of PS. Such changes may be identified by the DSP 350 and reported as possible predictors of network instability or outage along the fiber path. In some embodiments the DSP 350 reports such changes to an SDN controller 390 of an SDN control plane so that the SDN controller 390 may reconfigure the network 100 to either avoid a service disruption or if necessary to re-establish connectivity of the network 100. In other embodiments, the DSP 350 reports an alarm condition to a network operator, e.g. a human operator, who may manage the network according to established protocols.

Thus in some embodiments the DSP 350 computes the $\Delta\theta$ and PS characteristics and may use these in a decision tree to determine further action, e.g. activate an alarm condition and/or provide information to an SDN controller to reconfigure the network. Those skilled in the pertinent art will appreciate that other DMs may be used, based on $\Delta\theta$ or based on another signal parameter, without departing from the scope of the disclosure and the claims. When located at each of the junctions $140_1$, $140_2$ . . . $140_n$ and the receiver 150 (FIG. 1), the monitor 300 may be used to determine a more refined status of each of the fiber spans $130_1$, $130_2$ . . . $130_n$ than is available in conventional systems, thus providing the system operator with improved granularity of system health.

As used in this discussion, a "complete" measurement means that all the Stokes parameters of a subject optical signal are separately resolved. As described with respect to embodiments below, a measurement may be "incomplete", meaning that not all the Stokes parameters are separately resolved. For example, in an incomplete measurement, some Stokes parameters may be mixed, e.g. $s_2$ and $s_3$. Furthermore, a measurement may or may not convert the received OSC signal to the electrical domain with loss of power. Measurements that nominally capture all the power of the OSC signal are referred to herein as "lossless", while measurements that discard a portion of the OSC signal power are referred to as "lossy". Thus, the configuration of the monitor 300 provides a "complete and lossless" measurement of the Stokes parameters, in that $s_1$, $s_2$ and $s_3$ are separately detected. The term "lossless" and phrases such as "no loss of power", "without loss of optical power" and similar are intended to convey that the received optical power is fully captured at the outputs of the PBSs 310. Such phrases are used with the understanding that the received optical signal may be attenuated due to, e.g. optical fiber or waveguide attenuation, scattering processes, and the like. In contrast, embodiments exemplified by FIG. 4, below, may not capture light from one or more outputs of a PBS that separates polarization components of the $OSC_{in}$ signal or a portion of this signal.

While an apparatus consistent with the OSC monitor 300 may effectively provide the described functionality, such a device may be costly in terms of component count and related expense and reliability. Therefore it may be desirable in some cases to reduce the component count while preserving the functionality of the monitor 300 to determine the functional health of the span.

Figure 4:
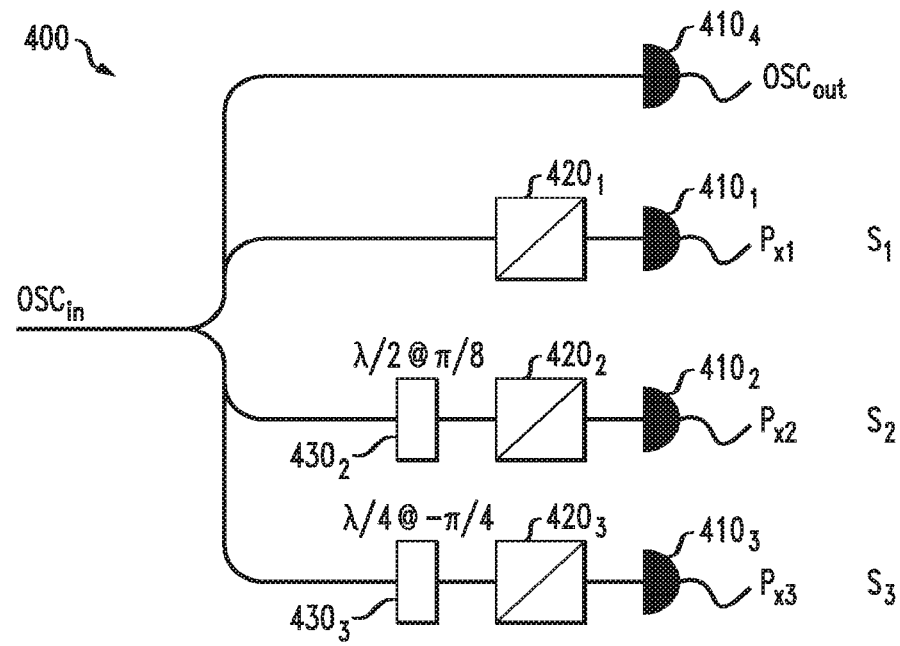
FIG. 4 illustrates an embodiment of an apparatus, e.g. an OSC monitor, configured to determine a DM from a received OSC signal, including by making a complete determination of the Stokes parameters of the OSC signal without completely capturing the received optical power of the OSC signal.

FIG. 4 presents another embodiment of an apparatus, e.g. an OSC monitor 400, that has a lower component count than the monitor 300, and provides complete but lossy characterization of the polarization state. FIG. 4 shows only the optical portion of the monitor 400, similar to the front end 305 of FIG. 3. Therefore those skilled in the pertinent art will understand that additional components such as A/D converters, optical sources, and a DSP may be present as appropriately configured, similar to FIG. 3.

In FIG. 4 the $OSC_{in}$ signal is split four ways between four detectors $410_1$ . . . $410_4$. A PBS $420_1$ receives a first signal portion and directs a single polarization component to the detector $410_1$. A PBS $420_2$ receives a second signal portion via a waveplate $\pi/8$ phase shifter $430_2$, and directs a single polarization component to the detector $410_2$. A PBS $420_3$ receives a third signal portion via a waveplate—$\pi/4$ phase shifter $430_3$, and directs a single polarization component to the detector $410_3$. The detector $410_4$ directly receives a fourth signal portion without modification.

The outputs of the detectors $410_1$, $410_2$, $410_3$, respectively designated $P_{x1}$, $P_{x2}$ and $P_{x3}$, may be used directly as the Stokes parameters in Eq. 1. Thus the quantity within the radical of Eq. 1 may be expressed as $$[P_{x1}(t_2)-P_{x1}(t_1)]^2 + [P_{x2}(t_2)-P_{x2}(t_1)]^2 + [P_{x3}(t_2)-P_{x3}(t_1)]^2 \quad (4)$$

Because light of one polarization from each of PBS 420 is discarded, the monitor 400 is lossy. But because the Stokes parameters are fully characterized, this configuration is regarded as yielding a complete measurement. The component count of the monitor 400 is lower than the monitor 300, (e.g. only four detectors and four A/D converters). Therefore, the monitor 400 may be advantageous in some implementations for overall optimization of the optical network 100. This embodiment illustrates the recognition by the inventors that a characterization of the polarization state of the OSC signal that is not both complete and lossless may still be used to determine a DM that is sufficient to monitor a fiber span as described above, thus reducing component count and system cost.

Figure 5:
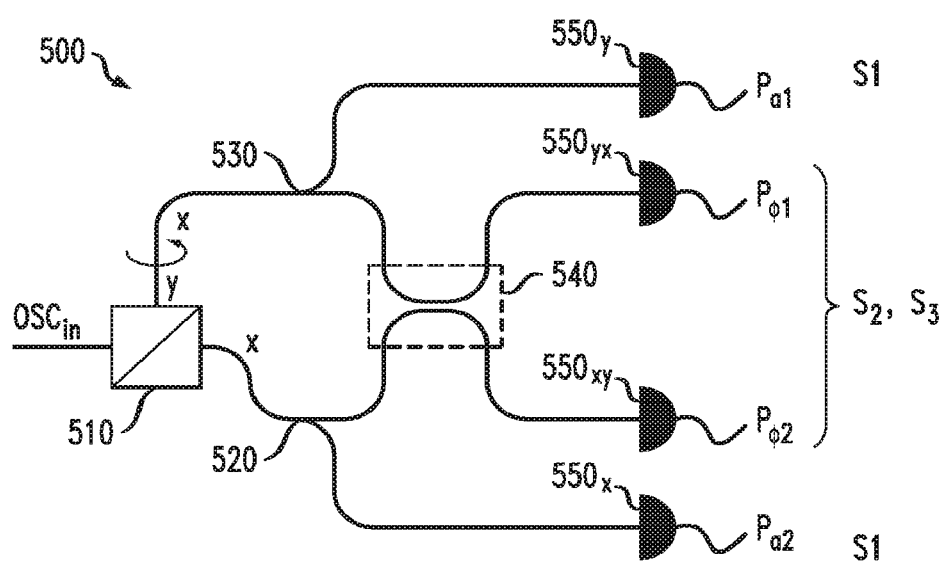
FIG. 5 illustrates another embodiment, e.g. an OSC monitor, configured to determine a DM from a received OSC signal, including by making a partial determination of the Stokes parameters of an OSC signal by interfering together orthogonal polarization components of the OSC signal after polarization-aligning the components, and detecting portions of the polarization components without loss of optical power.

FIGS. 5-8 present other embodiments in which the characterization of the OSC signal is both incomplete and lossless, and still provides useful information on the state of the OSC signal. These embodiments further lower the component count as compared to the monitors 300 and 400. Referring first to FIG. 5, an apparatus, e.g. an OSC monitor 500, is illustrated. Again, this figure shows only the optical portion of the monitor 500, with corresponding A/D converters, optical sources, and a processor being configured as needed similar to the monitors 300 and 400. In this embodiment a PBS 510 splits the OSC$_{in}$ signal into orthogonal polarizations. One component, e.g. x, is directed to a power splitter 520, which directs a first portion of the x-component to an interferometer 540 and a second portion to a detector 550$_x$. The y-component is polarization-aligned with the x-component, e.g. rotated π/2, and directed to a power splitter 530 that directs a first portion of the y component to the interferometer 540 and a second portion to a detector 550$_y$. One output of the interferometer 540 is directed to a detector 550$_{xy}$, and another output of the interferometer 540 is directed to a detector 550$_{yx}$. The outputs of the detectors 550$_x$ and 550$_y$ are respectively, designated P$_{a2}$ and P$_{a1}$. However, the outputs of the detectors 550$_{xy}$ and 550$_{yx}$, respectively designated P$_{\phi2}$ and P$_{\phi1}$, are a mix of the x- and y-polarized signals from the PBS 510, and may be understood by the DSP 200 to represent a relative phase of the x- and y-outputs of the PBS 510. A DM, e.g. the polarization rotation angular speed, may be determined by Eq. 5:

$$\frac{\Delta\theta}{\Delta t} = \frac{\frac{1}{\pi}\arcsin\left(\frac{1}{2}\sqrt{\Delta s_a^2 + \Delta s_\phi^2}\right)}{\Delta t} \tag{5}$$

where $$\Delta s_a = \frac{P_{a1}(t_2) - P_{a2}(t_2)}{P_{a1}(t_2) + P_{a2}(t_2)} - \frac{P_{a1}(t_1) - P_{a2}(t_1)}{P_{a1}(t_1) + P_{a2}(t_1)} \tag{6}$$

and $$\Delta s_\phi = \frac{P_{\phi1}(t_2) - P_{\phi2}(t_2)}{P_{\phi1}(t_2) + P_{\phi2}(t_2)} - \frac{P_{\phi1}(t_1) - P_{\phi2}(t_1)}{P_{\phi1}(t_1) + P_{\phi2}(t_1)}. \tag{7}$$

Notably, the monitor 500 has a substantially reduced part count, e.g. one PBS and four detectors, compared to the monitor 300 which has, e.g. three PBSs, six detectors and two waveplates. The characterization of the Stokes parameters by the monitor 500 is incomplete, in that the Stokes parameters are not fully resolved, e.g. s$_2$ and s$_3$ are mixed. While the interferometer 540 does not provide separate values of s$_2$ and s$_3$, the outputs are sensitive to changes in both s$_2$ and s$_3$. Thus, while this embodiment does not necessarily accurately characterize the polarization state of the OSC, it captures all of the light and is sensitive to movement of all of the Stokes parameters. Thus the PS calculated by the DSP is expected to be less accurate than for the embodiment of the monitor 300, but still qualitatively useful for monitoring the status of the preceding fiber section. In this embodiment only a single PBS is needed to produce a DM, significantly reducing cost relative to, e.g. the configuration of the monitor 300 or 400.

Figure 6:
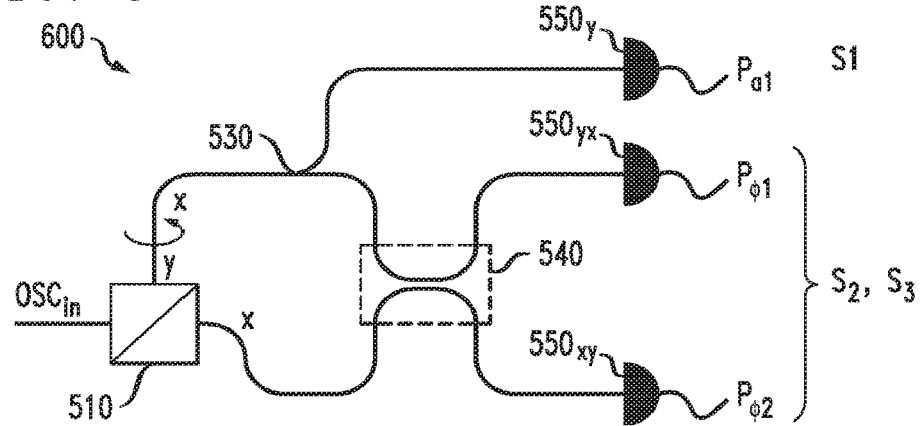
FIG. 6 illustrates an embodiment similar to that of FIG. 5, in which the component count is reduced and that makes a partial determination of the Stokes parameters of an OSC signal without losing optical power.

FIG. 6 presents another embodiment of an apparatus, e.g. an OSC monitor 600, that is a variation on the monitor 500. In this embodiment the detector 550$_x$ is eliminated, reducing the number of detectors by one unit. Thus, the P$_{a1}$ output may be used as s$_1$, and the P$_{\phi1}$ and the P$_{\phi2}$ outputs again provide the mixed s$_2$ and s$_3$ parameters. The polarization rotation angular speed may again be determined by Eq. 5, with S$_\phi$ determined as in Eq. 7, and S$_\alpha$ determined by Eq. 8:

$$\Delta s_a = \frac{P_{a1}(t_2)}{P_{a1}(t_2) + P_{\phi1}(t_2 + P_{\phi2}(t_2))} - \frac{P_{a1}(t_1)}{P_{a1}(t_1) + P_{\phi1}(t_1) + P_{\phi2}(t_1)} \tag{8}$$

Similar to the monitor 500, the monitor 600 yields an incomplete measurement, but may provide a qualitative measure of the condition of the preceding optical span.

Figure 7:
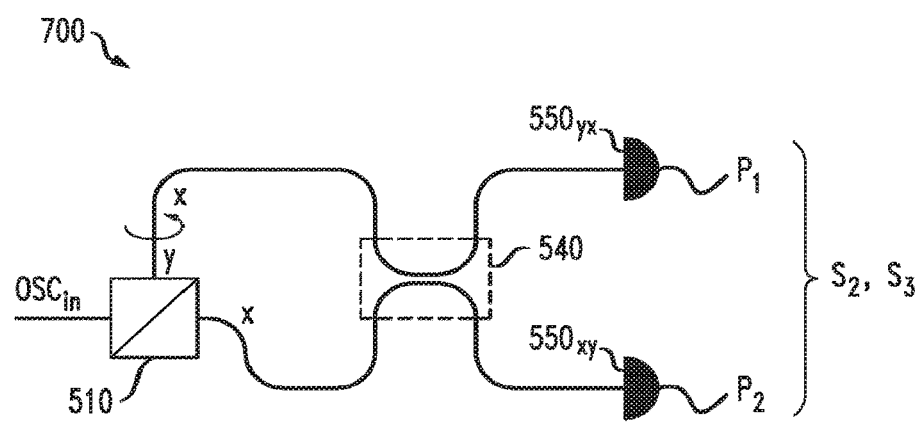
FIG. 7 illustrates another embodiment, e.g. an OSC monitor, configured to determine a DM from a received OSC signal, including by only detecting signals produced by interfering together properly aligned polarization components of an OSC signal without losing optical power.
Figure 8:
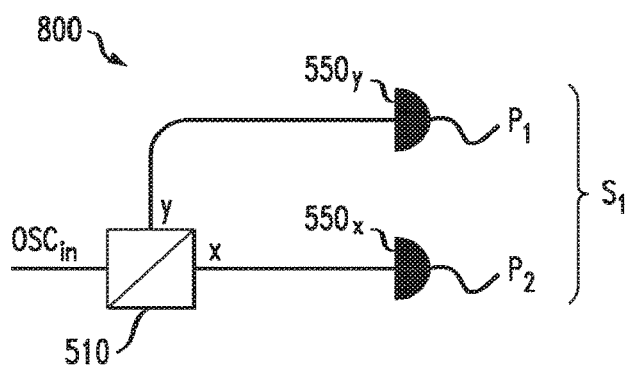
FIG. 8 illustrates another embodiment, e.g. an OSC monitor, configured to determine a DM from a received OSC signal, including by only detecting polarization components of an OSC signal directly from a PBS without discarding optical power.

FIG. 7 presents an embodiment of an apparatus, e.g. a two-armed OSC monitor 700, that further reduces the component count relative to the OSC monitor 600. In the monitor 700 embodiment, the detector 550$_y$ has been eliminated. The remaining detectors 550$_{xy}$ and 550$_{xy}$, respectively output P$_1$ and P$_2$. FIG. 8 illustrates a variation on the two-armed configuration of FIG. 7, dispensing with the interferometer 540. The detectors 550$_{xy}$ and 550$_{xy}$ in this case again respectively output P$_1$ and P$_2$. The polarization rotation angular speed may be determined from Eq. 9:

$$\frac{\Delta\theta}{\Delta t} = \frac{\frac{1}{\pi}\arcsin\left(\frac{1}{2}\sqrt{\Delta S^2}\right)}{\Delta t} \tag{9}$$

where $$\Delta S = \frac{P_1(t_2) - P_2(t_2)}{P_1(t_2) + P_2(t_2)} - \frac{P_1(t_1) - P_2(t_1)}{P_1(t_1) + P_2(t_1)} \tag{10}$$

The inaccuracies resulting from the elimination of s$_1$ measurement from the monitor 700 and the elimination of the s$_2$ and s$_3$ measurements from the monitor 800 is expected to result greater inaccuracy of the characterization of the fiber span than in some other embodiments. This point is discussed further below.

Figure 9:
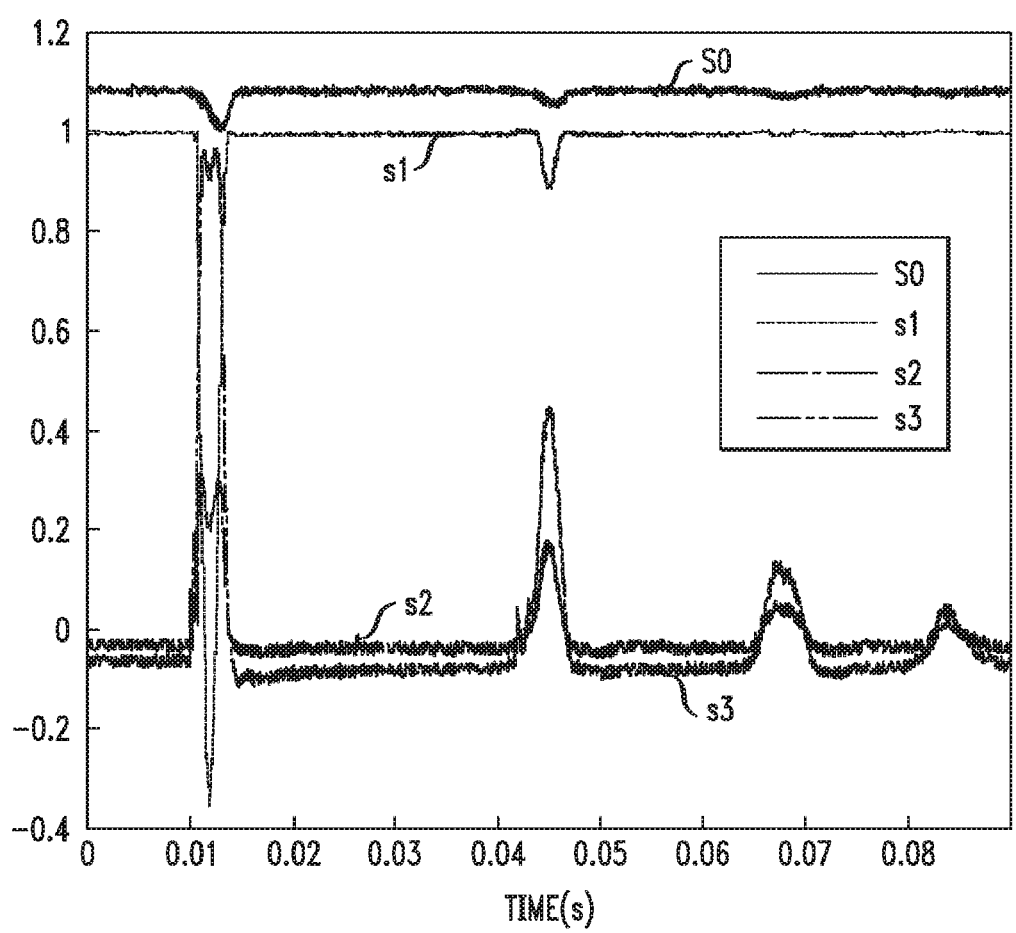
FIG. 9 illustrates example Stokes parameters experimentally determined from a mechanically stressed optical fiber using a commercial polarization analyzer.

The several described embodiments may be experimentally evaluated using a figure of merit (FOM) related to a standard measurement of polarization states while subjecting a test fiber to a model stressor, e.g. mechanical impact. FIG. 9 illustrates measured Stokes parameters S$_0$ (intensity), s$_1$, s$_2$ and s$_3$ obtained by a commercial polarization analyzer, e.g. an Adaptif A3300, as a function of time after tapping a test fiber with a hammer-like device with a force well below a threshold of damage. The initial impact occurs at about 10 ms, with bounces of the hammer at 45 ms, 70 ms and 85 ms. The signal traces display, from top down, S$_0$, s$_1$, s$_2$ and s$_3$. A FOM may be defined based on the polarization rotation speed DM, PS, defined earlier, e.g. R$_{FOM}$=PS$_{Embodiment}$/PS$_{Standard}$, where PS$_{Standard}$ represents PS determined from the Stokes parameters characterized by the commercial polarization analyzer, and PS$_{Embodiment}$ represents PS determined from one of the embodiments described above. Using this methodology, PS$_{Standard}$≥PS$_{Embodiment}$, so R$_{FOM}$≤1, with R$_{FOM}$=1 representing exact numerical agreement between the standard measurement and the embodiment. The R$_{FOM}$ provides a quantitative measure of the accuracy of the PS FOM obtained by the various monitor embodiments compared to the standard measurement. Thus the R$_{FOM}$ may be used to objectively compare the performance of the various embodiments.

Figure 10:
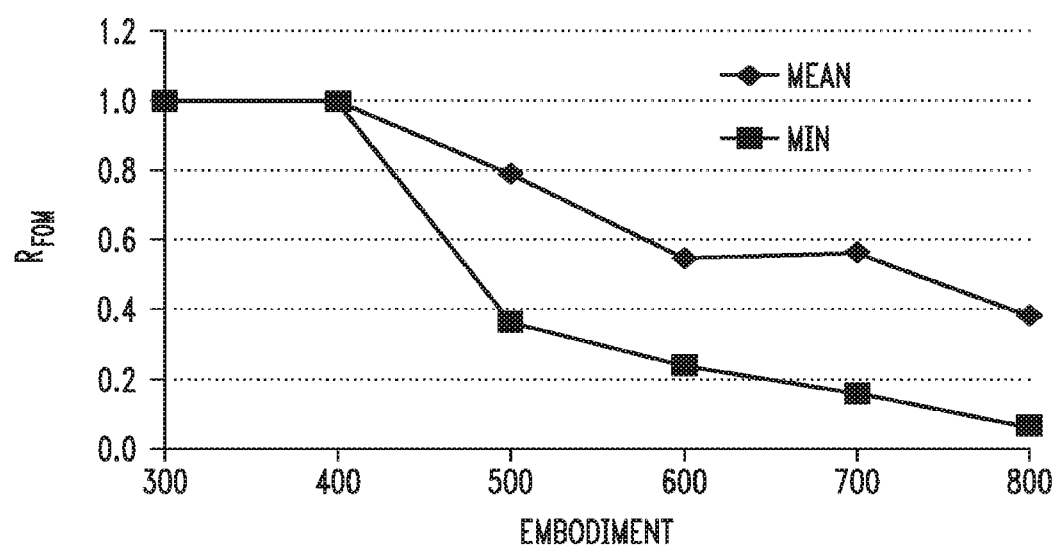
FIG. 10 illustrates a figure of merit $R_{FOM}$ of characterizations of the mechanically stressed optical fiber of FIG. 9 corresponding to some of the embodiments described herein, e.g.

FIG. 10 illustrates R$_{FOM}$ for each of the monitors 300-800. This figure reflects measurements of R$_{FOM}$ for 92 individual impacts of the test fiber, and includes two characteristics, "mean ratio" and "min ratio". The mean ratio is the average of the 92 measurements, while the min ratio is the smallest value of R$_{FOM}$ for each data set. According to these results, the monitors 300 and 400, which both provide complete measurements of the Stokes parameters, result in $R_{FOM}=1$ for both the min and the mean. Thus both of these embodiments provide a PS value that is apparently as accurate as the commercial standard, though it is noted that the monitor 400 is lossy, thus possibly limiting the length of the span 130 due to greater relative noise on the recovered signal. The monitors 500-800 result in mean values of $R_{FOM}$ decreasing from about unity to about 0.4, and corresponding minimum values of about 0.36, 0.23, 0.18, and 0.05.

The results of FIG. 10 indicate that while all the described embodiments yield mean values that may be close or equal to the standard measurement, the scatter, or uncertainty, of the $R_{FOM}$ increases with reduction in component count. Without limitation to any particular embodiment, one interpretation of these results suggests that embodiments consistent with the monitors 500 and 600 provide an acceptable trade-off between measurement accuracy and component reduction. Moreover, noting that in some cases the operational objective of using such monitors is making a qualitative determination of possible present or imminent damage to one of the fiber spans 130, accuracy of the PS FOM may be of secondary importance to obtaining sufficient signal to make the qualitative determination with the fewest components necessary. Thus, even though the monitor 800 displays the smallest mean and min $R_{FOM}$ ratios in the limited presented data set, in some situations this monitor may be sufficiently accurate to enable the qualitative determination using very few components.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, in conjunction with the appropriate computer hardware, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising:
an optical transmission network including optical fiber spans end-connected by junction nodes, the optical transmission network being configured to transmit optical communication signals via the optical fiber spans; and
a network controller; and
wherein, at least, an individual one of the junction nodes is connected to receive an optical-supervisory-channel (OSC) signal from one of the optical fiber spans end-connected by the individual one of the junction nodes, wherein the individual one of the junction nodes includes a monitor to make polarization-sensitive measurements of the OSC signal, and wherein the individual one of the junction nodes is configured to transmit control parameters determined based on the polarization-sensitive measurements of the OSC signal to the network controller; and
wherein the monitor comprises two or more photodetectors connected to a polarization beam splitter to make the polarization-sensitive measurements, and a digital signal processor configured to determine the control parameters by processing digitalizations of the polarization-sensitive measurements.

2. The apparatus of claim 1,
wherein the monitor is configured to make some of the polarization-sensitive measurements at different times; and
wherein the digital signal processor is configured to determine at least one of the control parameters based on the polarization-sensitive measurements made at said different times.

3. The apparatus of claim 2, wherein the network controller is configured to adjust traffic routing in the optical transmission network.

4. The apparatus of claim 2, wherein the network controller is configured to adjust traffic routing in the optical transmission network in response to some of the control parameters.

5. The apparatus of claim 1, wherein the OSC signal is out-of-band with respect to the optical communication signals.

6. The apparatus of claim 5, wherein the network controller is configured to adjust traffic routing in the optical transmission network in response to some of the control parameters.

7. The apparatus of claim 1, wherein the two or more photodetectors are connected to measure intensities from different outputs of the polarization beam splitter.

8. The apparatus of claim 1, wherein the optical transmission network is an optical transmission line in which each of the junction nodes only end-connects two of the optical fiber spans.

9. The apparatus of claim 1, wherein the network controller is configured to adjust traffic routing in the optical transmission network.

10. The apparatus of claim 1, wherein the network controller is configured to adjust traffic routing in the optical transmission network in response to some of the control parameters.

11. The apparatus of claim 7, wherein the digital signal processor is configured to determine at least some of the control parameters based on a difference of the intensities measured by two of the two or more photodetectors.

12. The apparatus of claim 7, wherein the digital signal processor is configured to determine at least some of the control parameters based on differences of the intensities measured by two of the two or more photodetectors at different times.

13. The apparatus of claim 1, wherein the digital signal processor is configured to determine at least some of the control parameters based on a polarization-rotation angular speed, said speed being determined based on differences of intensities measured by two of the two or more photodetectors connected to different outputs of the polarization beam splitter.

14. The apparatus of claim 1, wherein another one of the junction nodes is connected to receive the OSC signal from one of the optical fiber spans end-connected by the another one of the junction nodes, wherein the another one of the junction nodes includes another monitor to make other polarization-sensitive measurements of the OSC signal received therein, and wherein the another one of the junction nodes is configured to transmit other control parameters determined based on the other polarization-sensitive measurements to the network controller; and
wherein the another monitor comprises two or more other photodetectors connected to another polarization beam splitter to make the other polarization-sensitive measurements, and another digital signal processor configured to determine the other control parameters by processing digitalizations of the other polarization-sensitive measurements.

15. The apparatus of claim 14, wherein the network controller is configured to adjust traffic routing in the optical transmission network in response to some of the control parameters and in response to some of the other control parameters.

* * * * *